United States Patent
Colt, Jr. et al.

(10) Patent No.: US 10,228,685 B2
(45) Date of Patent: Mar. 12, 2019

(54) USE OF MULTIVARIATE MODELS TO CONTROL MANUFACTURING OPERATIONS

(71) Applicant: GLOBALFOUNDRIES INC., Grand Cayman (KY)

(72) Inventors: John Z. Colt, Jr., Williston, VT (US); Venkata N. Pavuluri, New Rochelle, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 531 days.

(21) Appl. No.: 14/920,376

(22) Filed: Oct. 22, 2015

(65) Prior Publication Data
US 2017/0115658 A1    Apr. 27, 2017

(51) Int. Cl.
G05B 19/41    (2006.01)
G05B 19/418    (2006.01)

(52) U.S. Cl.
CPC ............ *G05B 19/4188* (2013.01); *G05B 2219/32359* (2013.01); *Y02P 90/02* (2015.11)

(58) Field of Classification Search
CPC ...... G05B 19/4188; G05B 2219/32359; Y02P 90/02
See application file for complete search history.

(56) References Cited

U.S. PATENT DOCUMENTS

| | | | | |
|---|---|---|---|---|
| 6,564,119 B1 * | 5/2003 | Vaculik | ................. | B22D 11/16 164/151.5 |
| 6,597,959 B1 * | 7/2003 | Backa | ................. | G05B 13/048 700/127 |
| 6,735,490 B2 | 5/2004 | Anand et al. | | |
| 7,349,746 B2 * | 3/2008 | Emigholz | ............ | C10G 11/187 700/21 |
| 8,396,583 B2 | 3/2013 | Tsai et al. | | |
| 8,755,939 B2 | 6/2014 | Macharia et al. | | |
| 9,208,209 B1 * | 12/2015 | Katz | ..................... | G06N 5/025 |

(Continued)

OTHER PUBLICATIONS

Jardine, A.K.S.; Lin, D. and Banjevic, D., "A Review on Machinery Diagnostics and Prognostics Implementing Condition-Based Maintenance", Feb. 24, 2005, Mechanical System and Signal Processing, 20 (2006) 1483-1510.*

(Continued)

*Primary Examiner* — Mohammad Ali
*Assistant Examiner* — Kelvin Booker
(74) *Attorney, Agent, or Firm* — Thompson Hine LLP

(57) ABSTRACT

A computer-implemented method, system, and/or computer program product controls manufacturing devices in a manufacturing environment. One or more processors receive sensor readings, which detect conditions that are unique to different areas within the manufacturing environment, in order to generate models of operations for each area in the manufacturing environment. One or more processors generate an ensemble model by extracting information from the models to describe a relationship between the conditions. One or more processors generate a device control signal, based on the ensemble model, that adjusts operations in the different areas in order to ameliorate the detected conditions.

14 Claims, 7 Drawing Sheets

(56) References Cited

U.S. PATENT DOCUMENTS

| | | | | |
|---|---|---|---|---|
| 2002/0062162 | A1* | 5/2002 | Bunkofske | G05B 23/0221 700/108 |
| 2004/0091135 | A1* | 5/2004 | Bourg, Jr. | G01N 21/8851 382/110 |
| 2004/0197012 | A1* | 10/2004 | Bourg, Jr. | G01N 21/8851 382/110 |
| 2005/0144274 | A1* | 6/2005 | Osborn | H04L 43/08 709/224 |
| 2005/0159911 | A1* | 7/2005 | Funk | G05B 19/418 702/104 |
| 2006/0073013 | A1* | 4/2006 | Emigholz | C10G 11/18 416/35 |
| 2006/0074598 | A1* | 4/2006 | Emigholz | C10G 47/36 702/185 |
| 2006/0074599 | A1* | 4/2006 | Emigholz | C10G 11/187 702/185 |
| 2007/0250292 | A1* | 10/2007 | Alagappan | C10B 55/00 702/184 |
| 2008/0103747 | A1* | 5/2008 | Macharia | G05B 13/048 703/11 |
| 2008/0103748 | A1* | 5/2008 | Axelrud | G05B 13/048 703/12 |
| 2008/0104003 | A1* | 5/2008 | Macharia | C12M 21/12 706/45 |
| 2008/0109100 | A1* | 5/2008 | Macharia | C10L 1/02 700/110 |
| 2008/0276137 | A1* | 11/2008 | Lin | G05B 23/0267 714/57 |
| 2009/0149981 | A1* | 6/2009 | Evans | G05B 23/0254 700/110 |
| 2009/0282296 | A1* | 11/2009 | Lin | G05B 23/024 714/46 |
| 2010/0082139 | A1* | 4/2010 | Macharia | G05B 17/02 700/103 |
| 2012/0003623 | A1* | 1/2012 | Bartee | G05B 17/02 435/3 |
| 2013/0331128 | A1* | 12/2013 | Qiu | H04W 4/021 455/456.3 |
| 2015/0254330 | A1* | 9/2015 | Chan | G06F 17/30598 707/613 |
| 2015/0331980 | A1* | 11/2015 | Iskandar | G06F 17/30598 707/737 |
| 2016/0342147 | A1* | 11/2016 | Iskandar | G05B 19/402 |

OTHER PUBLICATIONS

Salehi, M.; Bahreininejad, A. and Nakhai, I., "On-line Analysis of Out-of-Control Signals in Multivariate Manufacturing Processes Using a Hybrid Learning-Based Model", Jun. 26, 2010, Neurocomputing, 74, (2011), 2083-2095.*

Li, S., "Monitoring and Diagnosis of Process Faults and Sensor Faults in Manufacturing Processes", Dec. 2008, Theses and Dissertations, University of Iowa.*

Spanos, C.J., "Statistical Process Control in Semiconductor Manufacturing", Apr. 5, 1991, Proceedings of the IEEE, vol. 80, No. 6.*

Yu, J.-B. and Xi, L.-F., "A Neural Network Ensemble-Based Model for Online Monitoring and Diagnosis of Out-of-Control Signals in Multivariate Manufacturing Processes", 2009, Expert Systems with Applications, 36, 909-921.*

P. Mell et al., "The NIST Definition of Cloud Computing", National Institute of Standards and Technology, Information Technology Laboratory, Sep. 2011, pp. 1-7.

B.L. Walsh et al., "45nm Yield Model Optimization", IEEE, 22nd Annual IEEE/SEMI Advanced Semiconductor Manufacturing Conference (ASMC), 2011, pp. 1-4 (Abstract Only).

* cited by examiner

USE OF MULTIVARIATE MODELS TO CONTROL MANUFACTURING OPERATIONS

BACKGROUND

The present disclosure relates to the field of manufacturing products, and specifically to controlling manufacturing devices used in manufacturing operations. Still more specifically, the present invention relates to utilizing multivariate models to generate control signals used to control manufacturing devices in manufacturing operations.

SUMMARY

A computer-implemented method, system, and/or computer program product controls manufacturing devices in a manufacturing environment. One or more processors receive a first sensor reading from a first sensor device in a first manufacturing area of the manufacturing environment, where the first sensor device detects a first condition that is unique to the first manufacturing area. The processor(s) generate a first model of manufacturing activities that occur within the first manufacturing area, where the first model incorporates the first condition that is unique to the first manufacturing area. The processor(s) receive a second sensor reading from a second sensor device in a second manufacturing area of the manufacturing environment, where the second sensor device detects a second condition that is unique to the second manufacturing area. The processor(s) generate a second model of manufacturing activities that occur within the second manufacturing area, wherein the second model incorporates the second condition that is unique to the second manufacturing area. The processor(s) generate an ensemble model by extracting information from the first model and the second model, where the ensemble model describes a relationship between the first condition and the second condition. The processor(s) generate a device control signal based on the ensemble model, where the device control signal adjusts operations of a first manufacturing device in the first manufacturing area and a second manufacturing device in the second manufacturing area to ameliorate the first condition in the first manufacturing area and the second condition in the second manufacturing area.

DETAILED DESCRIPTION

Figure 1:
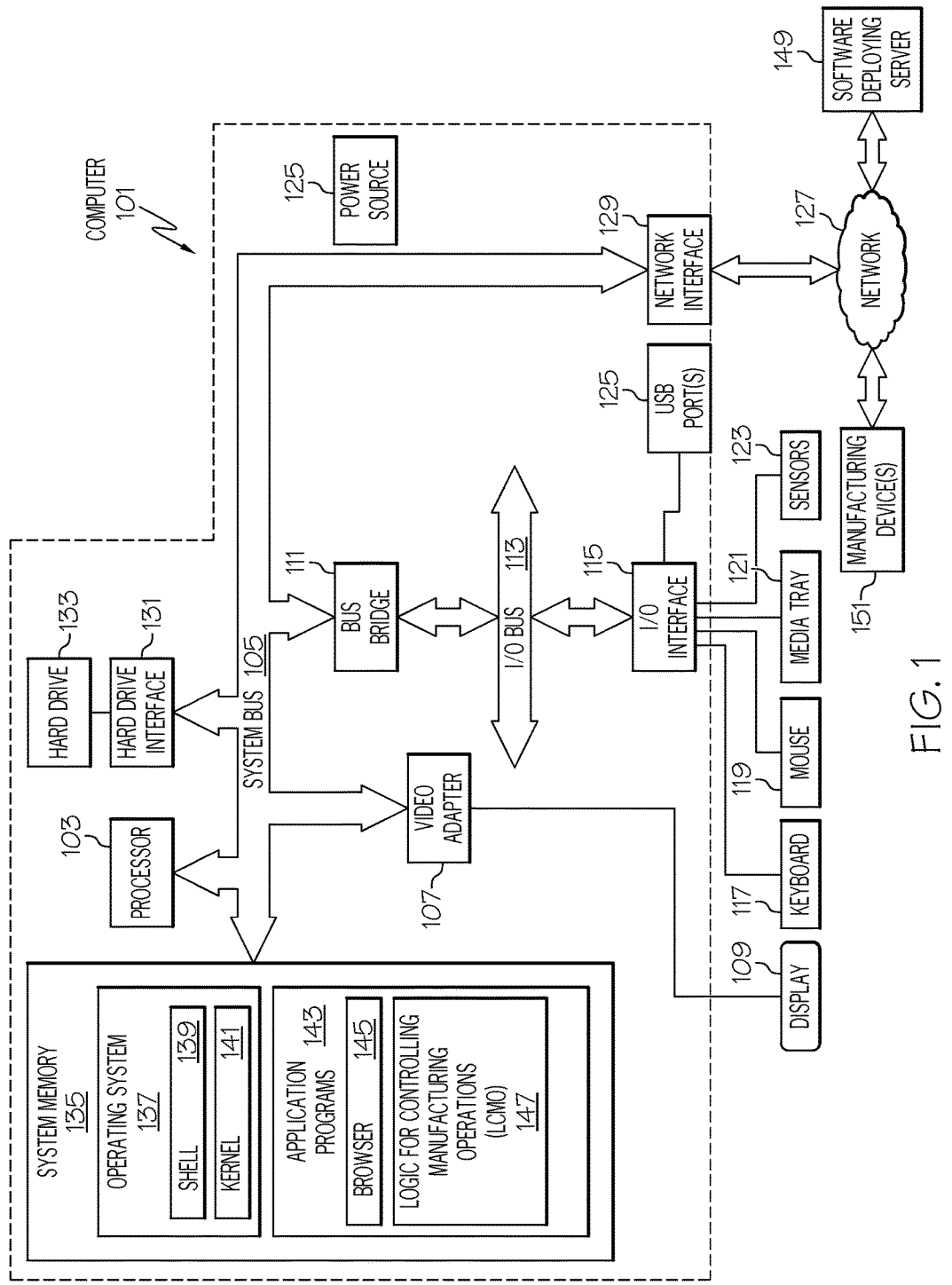
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or manufacturing device(s) 151 shown in FIG. 1; and/or independent multivariate models generating system 208, ensemble model generating system 210, device control signal generating system 212, and/or manufacturing devices 214a-214c shown in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and/or hardware sensor(s) 123.

Examples of hardware sensor(s) 123 include, but are not limited to: sensors that detect clock speed and CPU usage by processor 103: sensors that detect bus usage (i.e., bandwidth) of system bus 105 and/or I/O bus 113; environmental sensors such as atmospheric pressure sensors, thermometers, sound level sensors, etc.; product quality sensors that detect the color, weight, size etc. of products being manufactured in a manufacturing environment; etc. While sensors(s) 123 are depicted as being connected to I/O interface 115, in one or more embodiments sensor(s) 123 are coupled directly to processor 103, system bus 105, and/or I/O bus 113 (e.g., to directly measure operations and performance of components within computer 101).

While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129 to a network 127. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc. Network 127 may connect computer 101 to a software deploying server 149 and/or other systems/devices.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Controlling Manufacturing Operations (LCMO) 147. LCMO 147 includes code for implementing the processes described below, including those described in FIGS. 2-4. In one or more embodiments, software deploying server 149 deploys LCMO 147 to computer 101 on an as-needed basis.

Also within computer 101 is a power source 125. When plugged into a nearly unlimited power supply (e.g., a power grid from a power company), the power source 125 is the system of outlets, wires, transformers that support the power grid. However, when part of a mobile computing device, power source 125 is a battery.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Real time comprehensive modeling of complex manufacturing processes involve the integration of multiple data streams. Each data stream captures different variability mechanisms in the process, has a different monitoring scheme, and is under the responsibility of a different unit. A comprehensive model of the entire manufacturing process requires the collaboration of many units. The present invention provides a standardized monitoring tool for any data stream, configurable for each stream, and not requiring any user to have detailed knowledge of each stream. Each of these stand alone monitoring schemes generates summarized virtual parameters that are analyzed by a master modeling tool, which captures all the significant variability mechanisms from all data streams.

As described in various embodiments of the present invention, generalized analytical modeling tools used to generate a master modeling tool of a manufacturing operation are free of the need for independent inputs, and are able to extract mathematical descriptions (virtual parameters) of significant variability mechanisms from multivariate data streams. That is, inputs to the master modeling tool generator described herein are able to depend on other inputs (and thus are not independent inputs), due to the generation of independent multivariate models described herein. For example, in FIG. 3 discussed below, a lower level model (e.g., the PLS model shown in block 305) may utilize multiple in-line testing (ILT) sensor readings that describe multiple parameters from one or more manufacturing areas.

The process described herein identifies excursions from the process center, deviations from the process recipe, and source signals for variability or specified predicted outcomes. The use of these methods creates a real-time analytic modeling tool for a specific data stream, which monitors a subset of information describing a process. Each of these streams applications is a tool used to monitor a particular area in the process. Virtual parameters, which in one or more embodiments include a reduced dataset built from a multiplicity of parameters from each sensor, capture significant mechanisms from each data stream, which are then automatically combined into a higher level master model. Thus, an analytical model capturing all available variability mechanisms for the process is created.

A cascading deconvolution of the process models for different areas in a manufacturing facility/process identifies combinations of parameters, virtual or real, that relate to specific events of interest in the execution of the process. Thus, an analysis of events that manifest themselves as partial signals in multiple data streams, which would not be considered in combination in the prior art, is now enabled.

As described herein, a system generates a comprehensive quantitative real time process model from separate process monitoring regimes/models. Generalized process modeling and monitoring software are deployed as stand-alone tools to isolated process sectors in order to generate compatible, summarized metrics that explain multiple variability mechanisms at the isolated sectors. Coordinating software accumulates summarized metrics for significant mechanisms across all sectors and produces a process model explaining overall process outcome variability.

Processing across all parts of the system happens in "real time", thus resulting in a cadence that is controllable according to the requirements of the process dynamics and the speed of the information technology (IT) infrastructure that updates signals as fast as they happen.

The hierarchical structure (between models for certain areas and an overall ensemble model) allows higher speed processing nearer the process activity to enable automatic controls, while also providing comprehensive analytical models for the entire process over longer slower feedback loops.

Thus, in accordance with one or more embodiments of the present invention, a method combines information across disparate parts of a complex process using a real time information process architecture, generalized multivariate modeling tools, multivariate tools to monitor different parts of a complex process, logic to automatically extract summarized information from the modeling tools, logic to automatically combine the extracted information into an ensemble model, and a control signal generating system that generates controls signals for devices based on the ensemble model.

In one or more embodiments of the present invention, each modeling tool produces statistics that describe significant sources of variability in the specific data content.

In one or more embodiments of the present invention, the modeling tools are organized in hierarchical levels such that the summary statistics from the previous level are automatically aggregated into new models.

In one or more embodiments of the present invention, the highest level model is represented as a single model.

In one or more embodiments of the present invention, each model is analyzed to identify the input or combinations of input associated with events identified in an overall quality metric.

In one or more embodiments of the present invention, links between all models are preserved such that lowest level inputs relating to highest level events can be identified.

In one or more embodiments of the present invention, signals produced by the modeled process are analyzed in real time using all levels of the modeling hierarchy in parallel.

Figure 2:
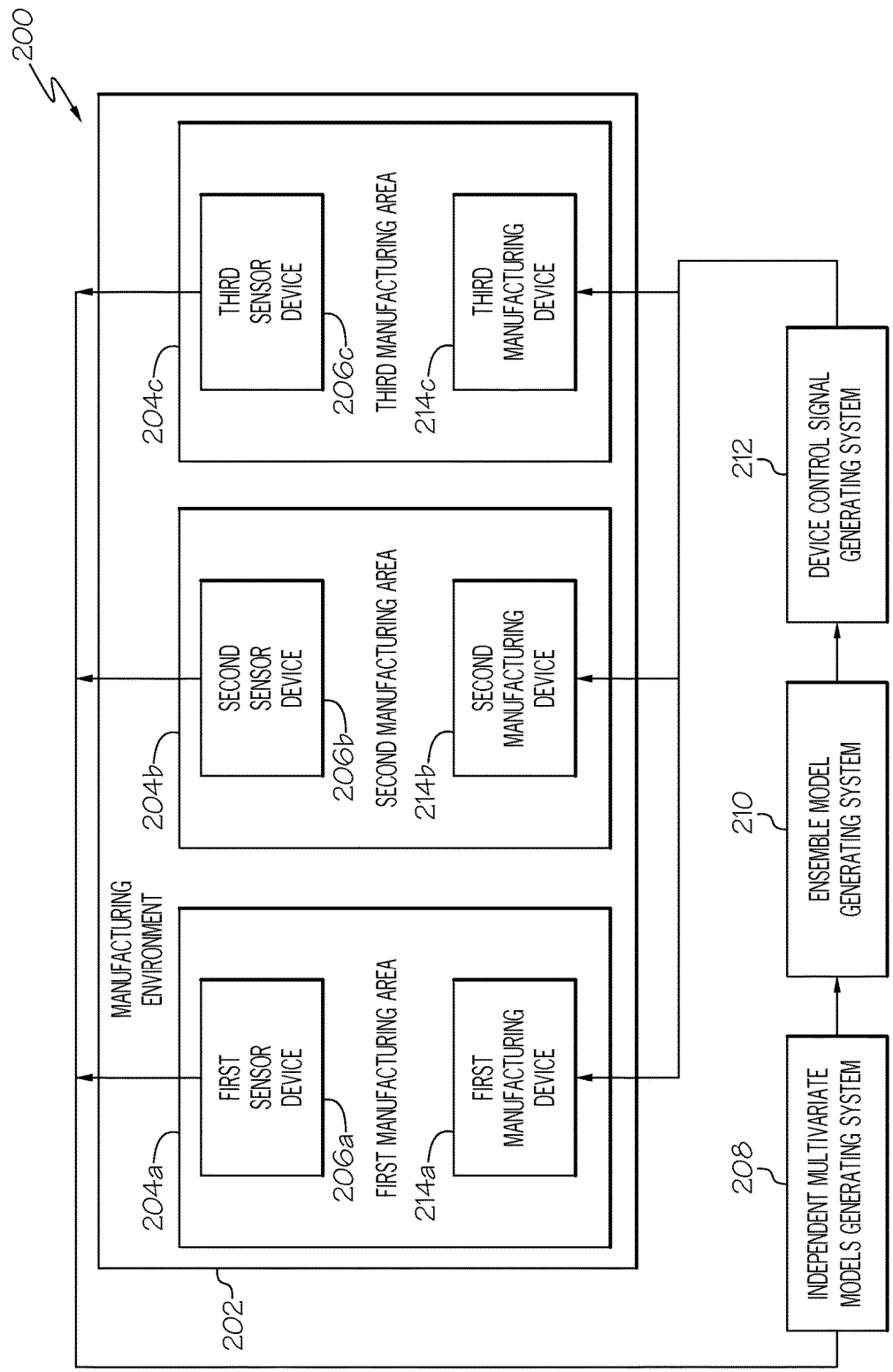
FIG. 2 illustrates an exemplary monitoring and control of manufacturing operations in a manufacturing environment in accordance with one or more embodiments of the present invention.

With reference now to FIG. 2, an exemplary system 200 for monitoring and controlling manufacturing operations in a manufacturing environment 202 in accordance with one or more embodiments of the present invention is presented.

As shown in FIG. 2, within the manufacturing environment 202 are multiple manufacturing areas 204a-204c (where "c" is an integer). For example, assume that manufacturing environment 202 is an automotive assembly line.

Assume further for purposes of illustration that the first manufacturing area 204a is an area in which headlights are installed on a vehicle, and that a first sensor device 206a is a visual sensor (e.g., a laser) that measures the amount of spacing between a headlight and a weatherproofing seal.

Assume further that the second manufacturing area 204b is an area in which wiring harnesses are installed on the vehicle, and the second sensor device 206b is a thermometer that measures the temperature of a wire leading to the headlight when the headlight is illuminated by a test power source.

Assume further that the third manufacturing area 204c is an area in which accessory control switches are installed in the vehicle, and the third sensor device 206c is an multimeter that measures continuity for contacts within the accessory control switches (i.e., determines whether or not the switches are working properly).

Assume now that an unacceptable percentage of the vehicles have headlights that stop working within a year. In the prior art, determining if there is any correlation between readings generated by the first sensor device 206a, the second sensor device 206b, and the third sensor device 206c is not feasible, since 1) there is no definitive way of knowing whether or not the three sets of sensor readings are related, and 2) there is no definitive way of knowing if a correlation of the three sets sensor readings has anything to do with the headlights failing.

Thus, the present invention creates three multivariate models of operations performed in the manufacturing environment 202 using an independent multivariate models generating system 208. That is, a first model of operations describes operations performed in the first manufacturing area 204a, including those described by the sensor readings from the first sensor device 206a. Similarly, a second model of operations describes operations performed in the second manufacturing area 204b, including those described by the sensor readings from the second sensor device 206b, and a third model of operations describes operations performed in the third manufacturing area 204c, including those described by the sensor readings from the third sensor device 206c. The models are "independent" (i.e., each model is autonomous, and does not depend on inputs from any of the other models or manufacturing areas 204a-204c, even though there may be a correlation, but not causation, between the inputs). The models are also "multivariate" (i.e., each model utilizes different types of inputs (sensor readings) from different types of sensors from sensors 206a-206c).

Summarized information is extracted from each of these three multivariate models for consolidation into an ensemble model by an ensemble model generating system 210. That is, summarized information (including information derived from the sensor devices 206a-206c) is extracted from the independent multivariate models created by the independent multivariate models generating system 208, and then incorporated into a single ensemble model that describes an overall process performed within all of the manufacturing areas 204a-204c.

The ensemble model is then sent to a device control signal generating system 212, which extracts data from the ensemble model (e.g., data that describes an overall anomaly in the system, such as an improper interaction between components installed in the different manufacturing areas 204a-204c) and creates control signals for the manufacturing devices 214a-214c. These control signals adjust each of the manufacturing devices 214a-214c such that the operations that they perform are adjusted in accordance with the ensemble model. For example, if the ensemble model shows a model in which headlights are failing due to a combination of 1) poor weatherproofing, 2) improper wiring sizing, and 3) poor quality light switches, then 1) a robot (first manufacturing device 214a) will reposition the headlights relative to their weather stripping, 2) a delivery robot (second manufacturing device 214b) will deliver a heavier gauge wiring harness to the second manufacturing area 204b, and 3) a delivery robot (third manufacturing device 214c) will deliver a different light switch to the third manufacturing area 204c.

In one embodiment of the present invention, readings from sensor devices 206a-206c in FIG. 2 are combined to create a virtual signal. That is, the actual sensor readings from sensor devices 206a-206c are used to generate a virtual sensor reading, that described an overall description of the manufacturing environment 202.

While only a single sensor (e.g., first sensor device 206a) is depicted within a particular manufacturing area (e.g., first manufacturing area 204a), it is to be understood that multiple sensor devices may be located within a single manufacturing area. Similarly, a single sensor may generate various sensor readings that are transmitted via multiple channels from the single sensor.

Figure 3:
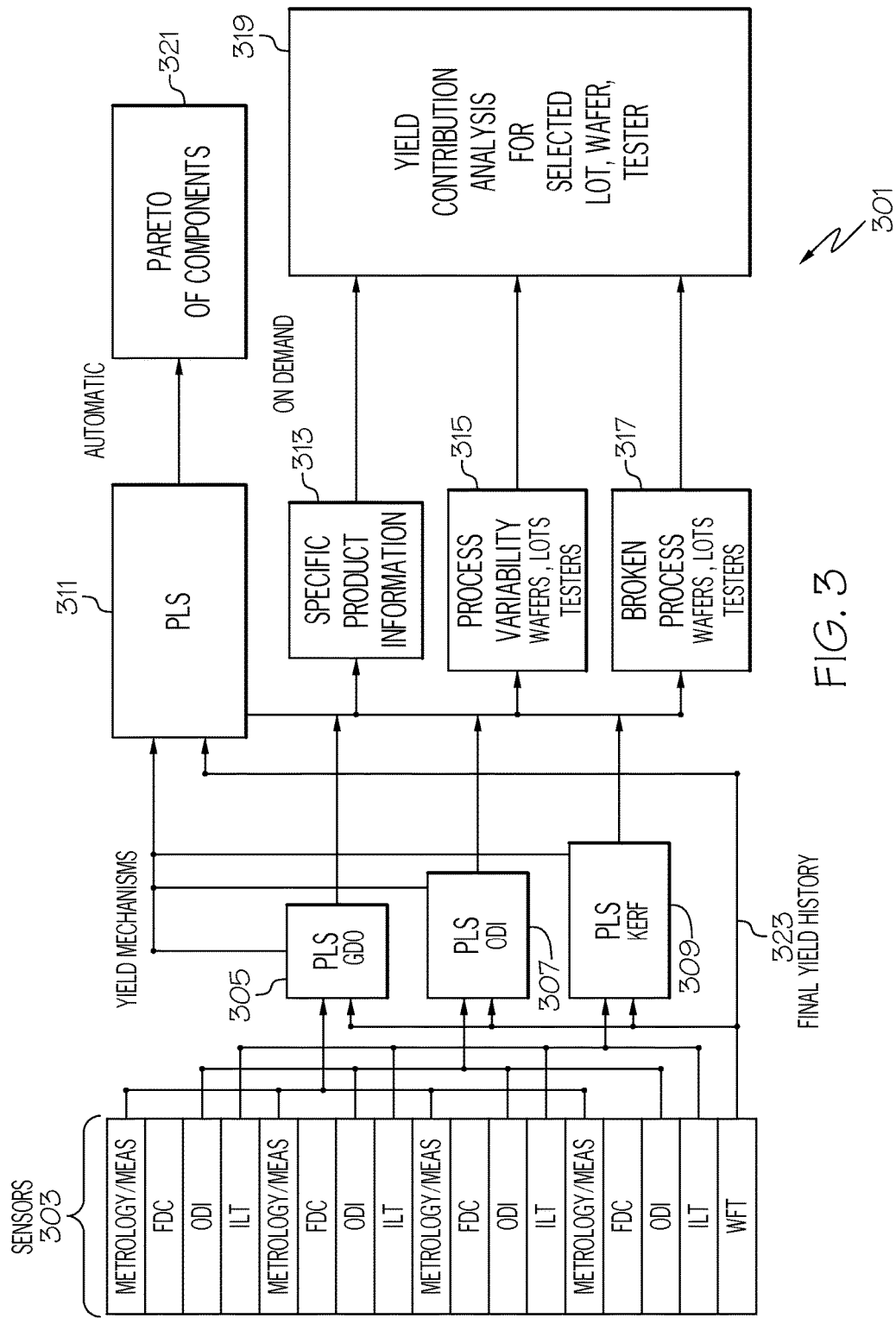
FIG. 3 depicts an exemplary embodiment of the present invention incorporated into a manufacture of semiconductor devices.

With reference now to FIG. 3, an exemplary embodiment of the present invention is depicted in graph 301 as being incorporated into a manufacture of semiconductor devices.

Sensors 303 within a manufacturing environment (in which a semiconductor device such as a semiconductor wafer—"wafer") detect/test various parameters regarding the semiconductor device during the manufacturing process. For example, the sensors 303 may include a probe that produces telemetry information describing a fault in the wafer and then classifies the fault according to a fault detection classification (FDC); a camera that performs an optical device inspection (ODI) of the wafer; an internal probe that generates an in-line test (ILT) of one or more circuits in the wafer; and a wafer final test (WFT) of each semiconductor unit (e.g., a microprocessor) on the wafer.

Readings from sensors 303 are then fed into a partial least squares (PLS) algorithm, also knows as a protection to latent structure (PLS) algorithm. PLS is a statistical regression algorithm that generates a linear regression model to find relations between two matrices of observations, in order to identify causes of particular events. PLS is particularly useful when observations are made by disparate types of sensors, such as the various types of sensors described herein. While PLS or other statistical algorithms may be utilized in one or more embodiments of the present invention, in other embodiments may use any calculating engine that does not require statistical independence between inputs to any one model.

While a PLS algorithm may be utilized in various embodiments of the present invention to produce statistically independent virtual parameters as part of the output from any individual models, in other embodiments virtual parameters from different models may not be statistically independent. Thus, all levels of the model hierarchy need not have a requirement for independent inputs.

In one or more embodiments of the present invention, a PLS algorithm is applied to the sensor readings from the disparate types of sensors in sensors 303 to evaluate gross defect occurrences on the wafer (e.g., gross measurements taken from optical instruments—see block 305); ODI readings on the various areas on the wafer (e.g., fine measurements taken by optical instruments—see block 307); and/or kerf distances (i.e., the result of slicing the wafer into various components/dice) on the wafer (e.g., additional measurements taken by optical instruments—see block 309). These PLS algorithms (305/307/309) result in multivariate models of the wafer, which are then fed along with the final yield history 323 into a PLS algorithm 311 that creates the ensemble model for the wafer. This ensemble model is then used to identify specific product information about the wafer (i.e., describing the functionality of the dice derived from the wafer—see block 313); process variability (i.e., describing how well various dice tested—see block 315); and broken processes (e.g., describing which dice and/or components within failed or were broken when the wafer was sliced apart—see block 317). That is, the ensemble model generated in block 311 can be deconstructed/evaluated into the various parameters shown in blocks 313/315/317, thus leading to a yield contribution analysis for a selected lot, wafer, tester, etc., as shown in block 319.

As shown in block 321, a Pareto distribution (i.e., a probability distribution used to describe various aspects of the wafer with relation to some predefined parameter) of the components of the wafer is also generated, in order to show how various aspects of the wafer affect the predefined parameter. For example, the predefined parameter may be how much the wafer is worth in monetary currency. The Pareto distribution defines how much this monetary currency is affected by various features of the wafer. For example, kerf width problems may reduce the value of the wafer to a first level, broken process may reduce the value of the wafer to a second level, etc. Alternatively, kerf width may indicate a preferred condition, in which adequate room (e.g., the kerf width) is reserved on the chip for placing electrical probing devices.

Thus, as shown in the semiconductor manufacturing example shown in FIG. 3, measurements are made at various points as process steps are completed. The process health is analyzed independently for monitored steps, and overall yields are evaluated in order to explain final end-of-process results. Defects are often detected at end-of-line inspections, but are not flagged by the process monitoring measurement groups. Thus, each monitoring group involves multiple parameters, since a problem can occur without any one individual parameter showing a significant excursion. Similarly, the whole process involves multiple monitoring groups, since a problem can occur without any one monitoring group showing a significant excursion.

Through use of the present invention, hierarchical models are generated by the overall yield system using detailed knowledge of measurement groups for the entire process, which is beyond the scope of any single sensor/system. This allows the system to provide tools for use at both the monitoring group level and the overall yield level, enabling automatic collaboration across all monitoring groups and the overall yield level.

Figure 4:
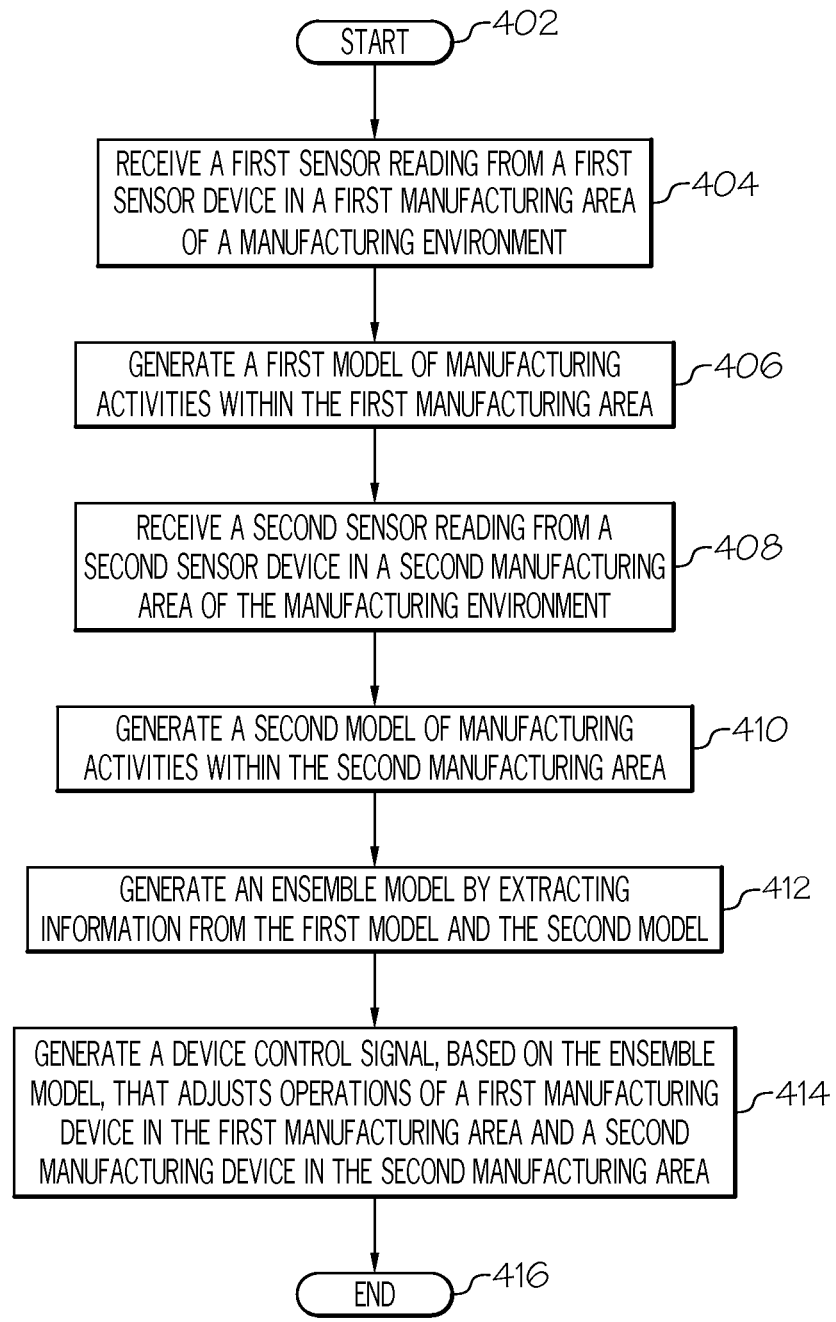
FIG. 4 is a high-level flow chart of one or more steps performed by one or more processors and/or other hardware to control manufacturing devices in a manufacturing environment in accordance with one or more embodiments of the present invention.

With reference now to FIG. 4, a high-level flow chart of one or more steps performed by one or more processors and/or other hardware to control manufacturing devices in a manufacturing environment in accordance with or more embodiments of the present invention is presented.

After initiator block 402, one or more processors (e.g., within the independent multivariate models generating system 208 shown in FIG. 2) receive a first sensor reading (or alternatively, multiple sensor readings) from a first sensor device (e.g., first sensor device 206a) in a first manufacturing area (e.g., first manufacturing area 204a) of the manufacturing environment 202, as described in block 404. The first sensor device detects a first condition that is unique to the first manufacturing area (i.e., detects a condition that is caused by and only occurs within the first manufacturing area).

As described in block 406, one or more processors (e.g., within the independent multivariate models generating system 208) generate a first model of manufacturing activities that occur within the first manufacturing area, such that the first model incorporates the first condition that is unique to the first manufacturing area.

As described in block 408, one or more processors (e.g., within the independent multivariate models generating system 208 shown in FIG. 2) receive a second sensor reading (or alternatively, multiple sensor readings) from a second sensor device (e.g., second sensor device 206b) in a second manufacturing area (e.g., second manufacturing area 204b) of the manufacturing environment. The second sensor device detects a second condition that is unique to the second manufacturing area (i.e., is not found in any manufacturing area other than in the second manufacturing area 204a).

As described in block 410, one or more processors (e.g., within the independent multivariate models generating system 208 shown in FIG. 2) generate a second model of manufacturing activities that occur within the second manufacturing area, such that the second model incorporates the second condition that is unique to the second manufacturing area.

As described in block 412, one or more processors (e.g., within the ensemble model generating system 210 shown in FIG. 2) generate an ensemble model by extracting information from the first model and the second model. Thus, the ensemble model describes a relationship between the first condition and the second condition. That is, although the first condition and the second condition are independent input factors when generating the first and second models, when incorporated into the ensemble model they become linked. This linkage is determined by a high-level overview of activities/conditions within the item being manufactured, which was not available when the lower-level first and second models were being created.

As described in block 414, one or more processors (e.g., within the device control signal generating system 212 in FIG. 2) generate a device control signal based on the ensemble model. The device control signal adjusts operations of a first manufacturing device (e.g., first manufacturing device 214a—such as a first robot/actuator/welding device/etc.) in the first manufacturing area and a second manufacturing device (e.g., second manufacturing device 214b) in the second manufacturing area to ameliorate the first condition in the first manufacturing area and the second condition in the second manufacturing area. That is, the device control signal generating system 212 generates a signal that alters the operation of the first and second manufacturing devices, such that the problem with the manufacturing process is resolved.

The flow chart ends at terminator block 416.

In one embodiment of the present invention, processor(s) within the independent multivariate models generating system 208 generate the first model and the second model based on a partial least squares (PLS) regression that further identifies the first condition and the second condition, as described herein. That is, the PLS regression identifies a statistical correlation between the occurrences of the first condition and the occurrences of the second condition to determine that there is a relationship, causal or non-causal, between the first and second conditions, thus leading to the actual identification of the first condition and the second condition, which would be masked/not obvious otherwise.

In one embodiment of the present invention, processor(s) within the ensemble model generating system 210 generate the ensemble model based on a partial least squares (PLS) regression that identifies the relationship between the first condition and the second condition. That is, the PLS regression identifies a statistical correlation between the occurrences of the first condition and the occurrences of the second condition to determine that there is a relationship, causal or non-causal, between the first and second conditions, and then generates the ensemble model based on this correlation.

In one embodiment of the present invention, processor(s) generate a Pareto of components based on the ensemble model (see block 311 in FIG. 3). The Pareto of components describes a probability of components in the Pareto affecting a predefined factor associated with a product created in the manufacturing environment, as described herein. Processor(s) with the device control signal generating system 212 then generate a supplemental device control signal based on the Pareto of components. This supplemental device control signal further adjusts operations of the first manufacturing device in the first manufacturing area and the second manufacturing device in the second manufacturing area to ameliorate the first condition in the first manufacturing area and the second condition in the second manufacturing area.

In one embodiment of the present invention, the first condition and the second condition are defects (anomalies) in a product being manufactured in the manufacturing environment. However, in another embodiment of the present invention, the first condition and the second condition are non-defects (normal traits) in a product being manufactured in the manufacturing environment. Thus, the ensemble model described herein is able to make correlations of conditions (which ultimately lead to a problem with the manufactured item) whether the conditions are anomalous (abnormal/defective) or nominal (normal).

In one embodiment of the present invention, the ensemble model is based not only upon sensor readings, but also upon raw materials coming into the manufacturing environment (or a particular manufacturing area) and operations being performed within the manufacturing environment (or a particular manufacturing area). For example, if a certain quality of chemicals are being used as feedstock in a petrochemical plant, and/or certain cracking operations are used to break down hydrocarbons in the petrochemical plant, this will impact the ensemble model according to predefined algorithms and/or other parameters used in the PLS processes described herein. Thus, one or more processors identify inputs of raw materials and manufacturing operations into the manufacturing environment, and then determine (using lookup tables, etc.) an impact of the inputs on the first sensor reading and the second sensor reading (e.g., how a particular feedstock will affect sensors to give inaccurate readings about a particular process going on in the petrochemical plant). Thus, one or more processors will determine an impact of the inputs on the ensemble model based on the impact of the inputs on the first sensor reading and the second sensor reading.

In one or more embodiments of the present invention, each modeling tool produces statistics that describe significant sources of variability in the specific data content. That is, by using PLS or other statistical tools, the ensemble model described herein identifies the root cause of problems on the manufacturing process.

In one or more embodiments of the present invention, the modeling tools are organized in hierarchical levels such that the summary statistics from the previous level are automatically aggregated into new models. That is, a statistical analysis of components within an initial ensemble model will produce detailed data describing the overall manufacturing process. This data can then be used to produce secondary/derivative ensemble models.

In one or more embodiments of the present invention, links between all models are preserved such that lowest level inputs relating to highest level events can be identified. That is, by linking the PLS activities shown in blocks 305/307/309 in FIG. 3 with the PLS activity shown in block 311, a correlation there-between can be established.

In one or more embodiments of the present invention, signals produced by the modeled process are analyzed in real time using all levels of the modeling hierarchy in parallel. That is, the PLS operations represented by blocks 305/307/309 all occur simultaneously, thus providing coherent real-time inputs to the PLS operation represented by block 311 in FIG. 3.

The present invention provides multiple advantages over the prior art, including but not limited to a better utilization of sensor readings, thus allowing a single unit to have a holistic understanding of all process areas. This permits collaboration between multiple areas, such that different manufacturing areas are able to operate more efficiently. Standardization of process monitoring metrics enables generalized tools at all process areas to produce comparable metrics, such that improvements may be applicable across multiple process areas. Since the sensor readings and PLS models described herein provide instant process excursion alerts, streams technology is enabled to generate corrective signals to the manufacturing devices at the highest speed allowed by IT infrastructure.

Furthermore, since the system enables a more rapid deployment of comprehensive process modeling, automatic combinations of standardized information flows produces comprehensive monitoring system from pre-existing lower level models without human intervention/effort.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
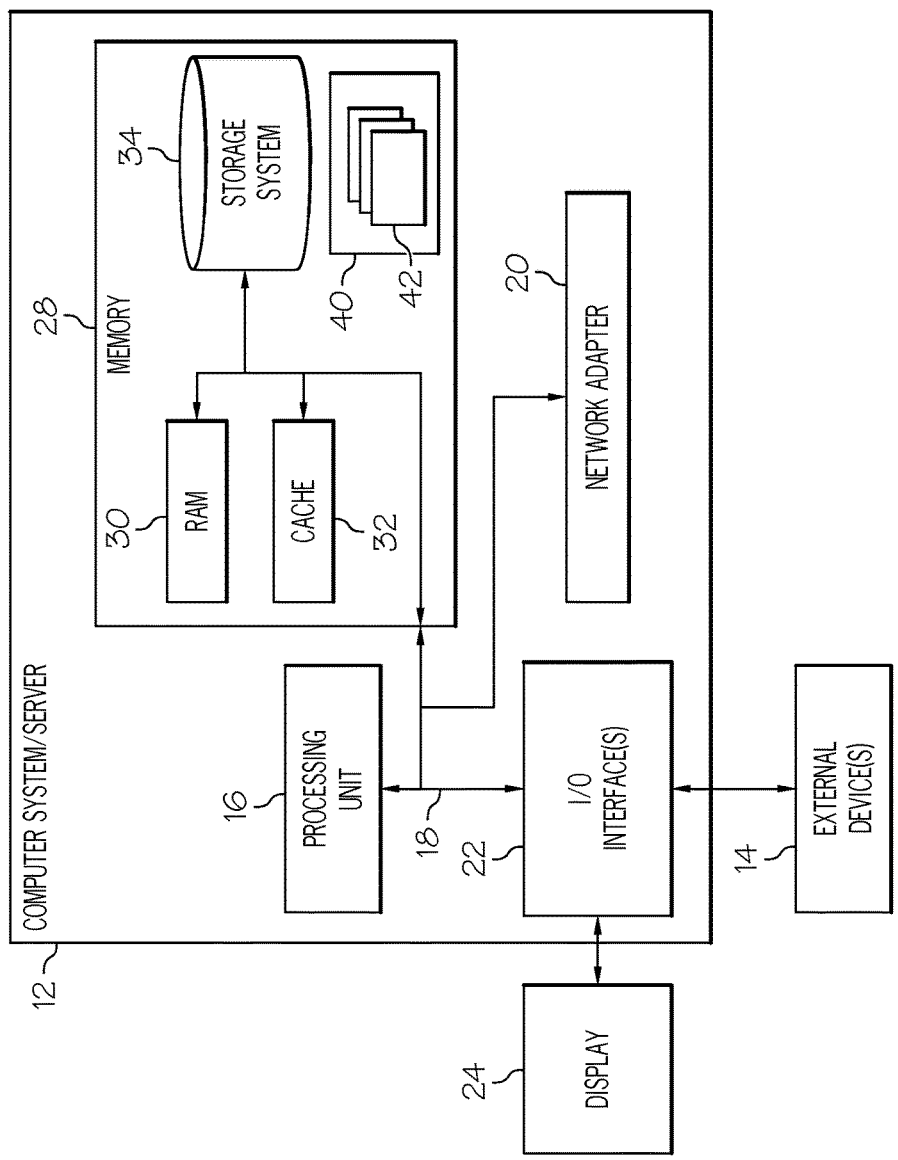
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
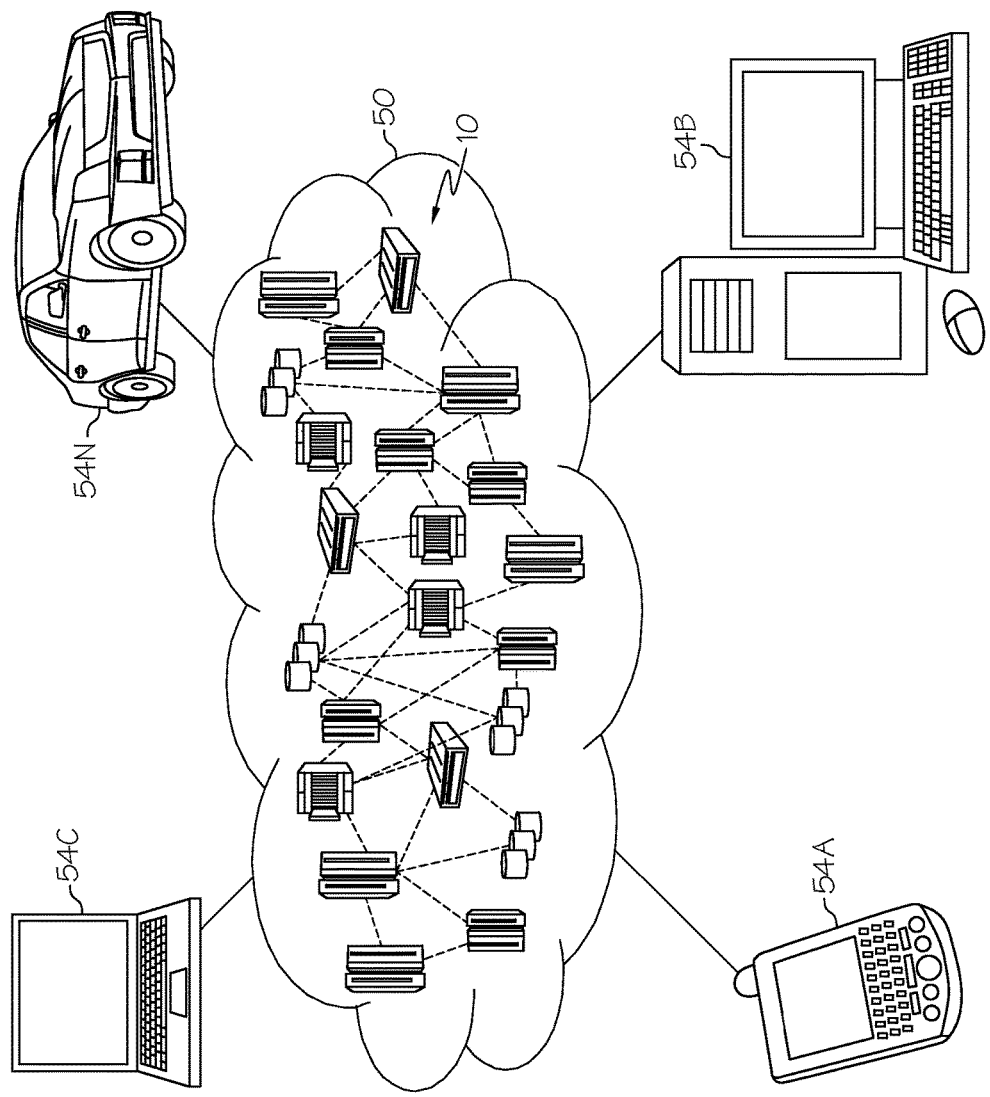
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 6 are intended to be illustrative only and that computing nodes 10 and cloud computing environment 50 can communicate with any type of computerized device over any type of network and/or network addressable connection (e.g., using a web browser).

Figure 7:
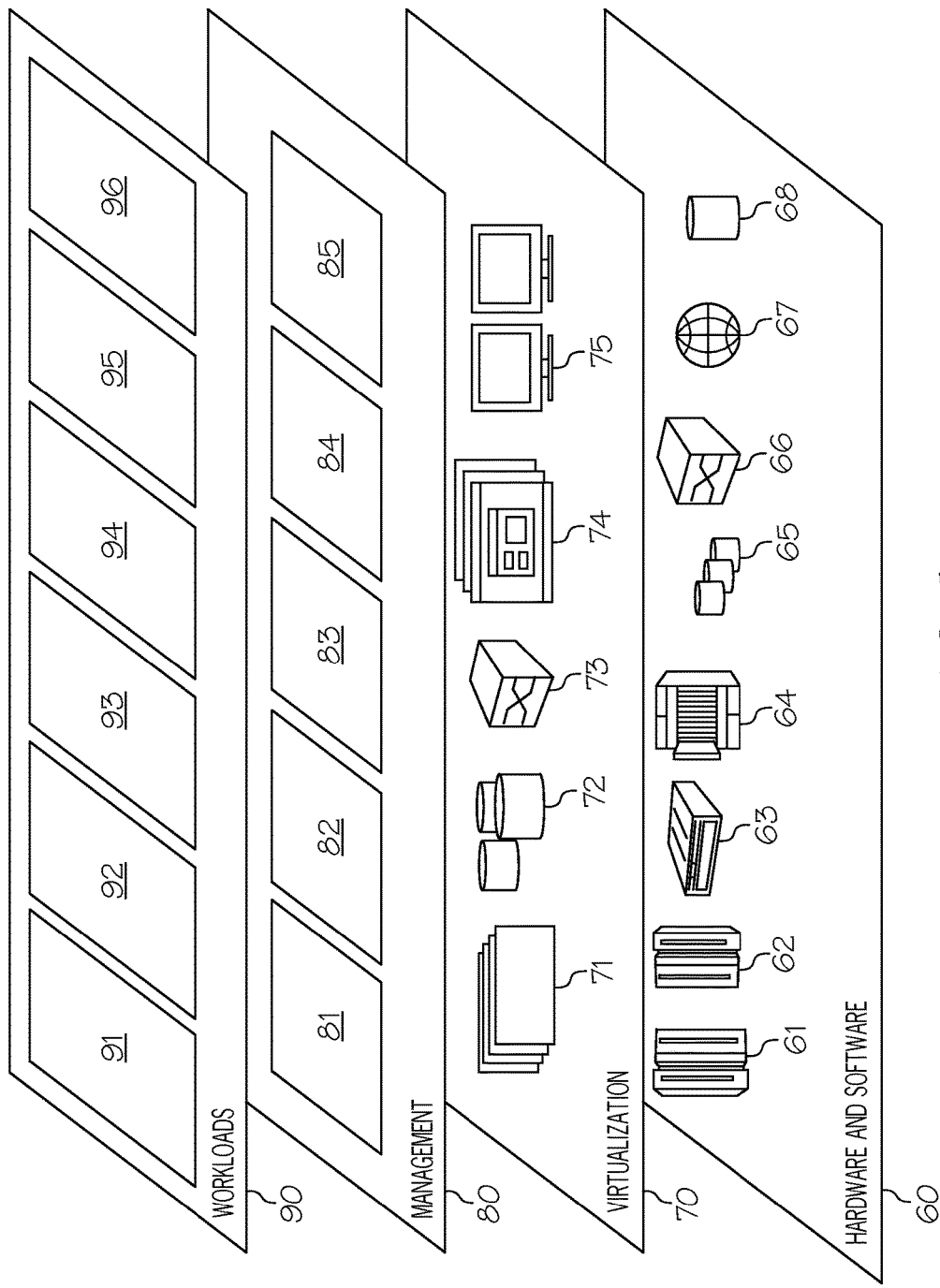
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and manufacturing device control processing 96 (for controlling manufacturing devices in a manufacturing environment as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of controlling manufacturing devices in a manufacturing environment, the computer-implemented method comprising:
   receiving, by one or more processors, a first sensor reading from a first sensor device in a first manufacturing area of the manufacturing environment, wherein the first sensor device detects a first condition that is associated with processing of a product within the first manufacturing area;
   generating, by one or more processors, a first model of manufacturing activities that occur within the first manufacturing area, wherein the first model incorporates the first condition that is associated with processing of the product within the first manufacturing area;
   receiving, by one or more processors, a second sensor reading from a second sensor device in a second manufacturing area of the manufacturing environment, wherein the second sensor device detects a second condition that is associated with processing of the product within the second manufacturing area;
   generating, by one or more processors, a second model of manufacturing activities that occur within the second manufacturing area, wherein the second model incorporates the second condition that is associated with processing of the product within the second manufacturing area;
   generating, by one or more processors, the first model and the second model based on a partial least squares regression that further identifies the first condition and the second condition;
   generating, by one or more processors, an ensemble model by extracting information from the first model and the second model, wherein the ensemble model describes a relationship between the first condition and the second condition;
   generating, by one or more processors, a single device control signal based on the ensemble model, wherein the single device control signal adjusts physical operations of a first manufacturing device in the first manufacturing area and a second manufacturing device in the second manufacturing area to ameliorate the first condition in the first manufacturing area and the second condition in the second manufacturing area concurrently; and
   generating, by one or more processors, a Pareto of components based on the ensemble model, wherein the Pareto of components describe a probability of components in the Pareto affecting a predefined factor associated with the product created in the manufacturing environment and
   generating, by one or more processors, a supplemental device control signal based on the Pareto of components, wherein the supplemental device control signal further adjusts operations of the first manufacturing device in the first manufacturing area and the second manufacturing device in the second manufacturing area to ameliorate the first condition in the first manufacturing area and the second condition in the second manufacturing area.

2. The computer-implemented method of claim 1, further comprising:
   generating, by one or more processors, the ensemble model based on a partial least squares regression that identifies the relationship between the first condition and the second condition.

3. The computer-implemented method of claim 1, wherein the first condition and the second condition are defects in the product being manufactured in the manufacturing environment.

4. The computer-implemented method of claim 1, wherein the first condition and the second condition are non-defects in the product being manufactured in the manufacturing environment.

5. The computer-implemented method of claim 1, further comprising:
   identifying, by one or more processors, inputs of raw materials and manufacturing operations into the manufacturing environment;
   determining, by one or more processors, an impact of the inputs on the first sensor reading and the second sensor reading; and
   determining, by one or more processors, an impact of the inputs on the ensemble model based on the impact of the inputs on the first sensor reading and the second sensor reading.

6. A computer program product to control manufacturing devices in a manufacturing environment, the computer program product comprising a non-transitory computer readable storage medium having program code embodied therewith, the program code readable and executable by a processor to perform a method comprising:
   receiving a first sensor reading from a first sensor device in a first manufacturing area of the manufacturing environment, wherein the first sensor device detects a first condition that is associated with processing of a product within the first manufacturing area;
   generating a first model of manufacturing activities that occur within the first manufacturing area, wherein the first model incorporates the first condition that is associated with processing of the product within the first manufacturing area;
   receiving a second sensor reading from a second sensor device in a second manufacturing area of the manufacturing environment, wherein the second sensor device detects a second condition that is associated with processing of the product within the second manufacturing area;
   generating a second model of manufacturing activities that occur within the second manufacturing area, wherein the second model incorporates the second condition that is associated with processing of the product within the second manufacturing area;

generating the first model and the second model based on a partial least squares regression that further identifies the first condition and the second condition;

generating an ensemble model from the first model and the second model, wherein the ensemble model describes a relationship between the first condition and the second condition;

generating a single device control signal based on the ensemble model, wherein the single device control signal adjusts physical operations of a first manufacturing device in the first manufacturing area and a second manufacturing device in the second manufacturing area to ameliorate the first condition in the first manufacturing area and the second condition in the second manufacturing area concurrently; and generating a Pareto of components based on the ensemble model, wherein the Pareto of components describe a probability of components in the Pareto affecting a predefined factor associated with the product created in the manufacturing environment and generating a supplemental device control signal based on the Pareto of components, wherein the supplemental device control signal further adjusts operations of the first manufacturing device in the first manufacturing area and the second manufacturing device in the second manufacturing area to ameliorate the first condition in the first manufacturing area and the second condition in the second manufacturing area.

7. The computer program product of claim 6, wherein the method further comprises:

generating the ensemble model based on a partial least squares regression that identifies the relationship between the first condition and the second condition.

8. The computer program product of claim 6, wherein the first condition and the second condition are defects in the product being manufactured in the manufacturing environment.

9. The computer program product of claim 6, wherein the first condition and the second condition are non-defects in the product being manufactured in the manufacturing environment.

10. The computer program product of claim 6, wherein the method further comprises:

identifying inputs of raw materials and manufacturing operations into the manufacturing environment;

determining an impact of the inputs on the first sensor reading and the second sensor reading; and determining an impact of the inputs on the ensemble model based on the impact of the inputs on the first sensor reading and the second sensor reading.

11. A computer system comprising:

a processor, a computer readable memory, and a non-transitory computer readable storage medium, wherein program instructions stored on the non-transitory computer readable storage medium are executed by the processor via the computer readable memory to perform a method comprising:

receiving a first sensor reading from a first sensor device in a first manufacturing area of a manufacturing environment, wherein the first sensor device detects a first condition that is associated with processing of a product within the first manufacturing area;

generating a first model of manufacturing activities that occur within the first manufacturing area, wherein the first model incorporates the first condition that is associated with processing of the product within the first manufacturing area;

receiving a second sensor reading from a second sensor device in a second manufacturing area of the manufacturing environment, wherein the second sensor device detects a second condition that is associated with processing of the product within the second manufacturing area;

generating a second model of manufacturing activities that occur within the second manufacturing area, wherein the second model incorporates the second condition that is associated with processing of the product within the second manufacturing area;

generating the first model and the second model based on a partial least squares regression that further identifies the first condition and the second condition;

generating an ensemble model from the first model and the second model, wherein the ensemble model describes a relationship between the first condition and the second condition;

generating a single device control signal based on the ensemble model, wherein the single device control signal adjusts physical operations of a first manufacturing device in the first manufacturing area and a second manufacturing device in the second manufacturing area to ameliorate the first condition in the first manufacturing area and the second condition in the second manufacturing area concurrently; and generating a Pareto of components based on the ensemble model, wherein the Pareto of components describe a probability of components in the Pareto affecting a predefined factor associated with the product created in the manufacturing environment and generating a supplemental device control signal based on the Pareto of components, wherein the supplemental device control signal further adjusts operations of the first manufacturing device in the first manufacturing area and the second manufacturing device in the second manufacturing area to ameliorate the first condition in the first manufacturing area and the second condition in the second manufacturing area.

12. The computer system of claim 11, wherein the method further comprises:

generating the ensemble model based on a partial least squares regression that identifies the relationship between the first condition and the second condition.

13. The computer system of claim 11, wherein the first condition and the second condition are defects in the product being manufactured in the manufacturing environment.

14. The computer system of claim 11, wherein the method further comprises:

identifying inputs of raw materials and manufacturing operations into the manufacturing environment;

determining an impact of the inputs on the first sensor reading and the second sensor reading; and determining an impact of the inputs on the ensemble model based on the impact of the inputs on the first sensor reading and the second sensor reading.

\* \* \* \* \*